R. T. WILSON.
ARTIFICIAL BAIT.
APPLICATION FILED NOV. 22, 1911.

1,060,873.

Patented May 6, 1913.

Richard T. Wilson, Inventor

UNITED STATES PATENT OFFICE.

RICHARD T. WILSON, OF HASTINGS, MICHIGAN, ASSIGNOR OF ONE-HALF TO ABEN E. JOHNSON, OF HASTINGS, MICHIGAN.

ARTIFICIAL BAIT.

1,060,873.  Specification of Letters Patent.  Patented May 6, 1913.

Application filed November 22, 1911. Serial No. 661,754.

*To all whom it may concern:*

Be it known that I, RICHARD T. WILSON, a citizen of the United States, residing at Hastings, in the county of Barry and State of Michigan, have invented a new and useful Artificial Bait, of which the following is a specification.

This invention relates to artificial fish bait and the principal object of the same is the provision of a casting and trolling bait which when drawn through the water will accurately simulate the movements of a live minnow, swimming in a zig-zag course near the surface of the water or beneath the same more or less deeply, as it is drawn through the water with varying speed.

A further important object of the invention is to provide an efficient and highly deceptive bait which can be cheaply manufactured, and which is by reason of its simplicity of form and construction, less subject to wear and disarrangement than is usual with artificial baits.

Having these objects in view, the invention consists in the construction and novel configuration of the parts as hereinafter fully described and particularly claimed, and illustrated in connection with the accompanying drawings, it being understood that various changes in the sizes, proportions and minor details of construction, within the scope of the claims, may be resorted to without departing from the spirit or materially sacrificing the advantages of the invention.

Figure 1:
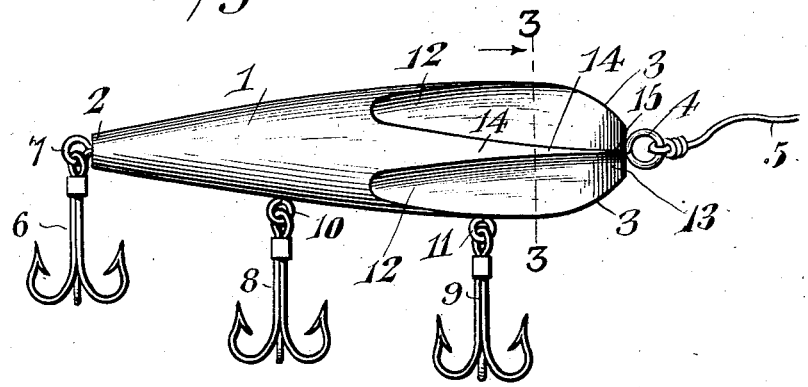
Figure 2:
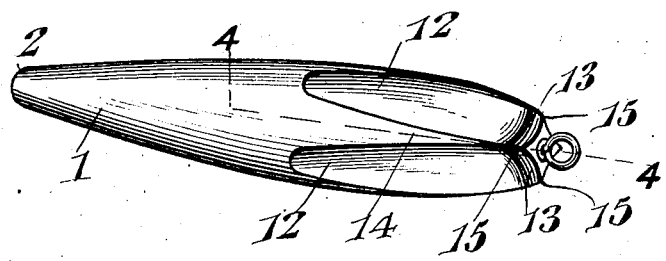
Figure 3:
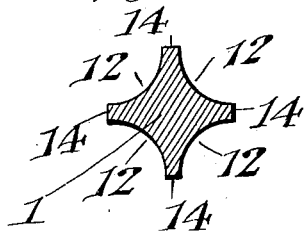
Figure 4:
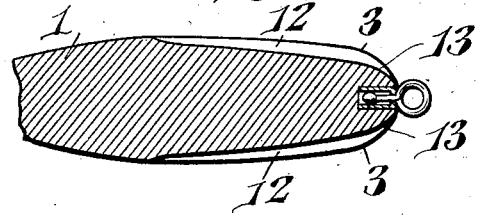

In the drawings, Figure 1 is a side elevation of an artificial bait embodying the invention; Fig. 2 is a perspective detail of the body of the bait with the hooks removed; Fig. 3 is a transverse section on the line 3—3 of Fig. 1; and Fig. 4 is a fragmentary section on the line 4—4 of Fig. 2.

The artificial bait, as illustrated, comprises a substantially conoidal body 1, having a tapering tail portion 2, and a more blunt head portion 3, provided with a preferably swiveled ring 4 for attachment to a casting or trolling line 5. At the tail end 2, a group of hooks 6 are secured by means of the ring 7, and along the lower edge beneath the body other groups of hooks 8 and 9 are suspended by rings 10 and 11, the distribution of the hook groups relative to each other and to the body 1 being such as to maintain the body horizontally when floating at rest.

The particularly distinctive feature of the bait, constructionally considered, is the provision of the forward fluted portion, wherein longitudinal flutes 12 are formed in the body portion having their axes arranged in planes including the axis of the body and extending from the medial portion thereof to the forward end, these grooves being symmetrically spaced around the body and gradually deepening and widening from their inception in the medial portion to their merger with the cheeks 13 of the face of the bait at the head end. At the beginning and also at the termination of the flutes, the curvature of the bottom line thereof forms a reverse curve having slightly greater dip toward the axis of the body at the initial and terminal portions of the flutes as shown in Fig. 2.

By reason of the widening of the flutes toward the head of the bait and on account of the slight tapering of the body at the head, the fillets 14 which separate the flutes are gradually tapered toward the front where they are lost in the merging side walls of adjacent flutes at 15. The flutes 12 are so arranged with reference to the hook groups that, where four in number as illustrated, one of the fillets is directly beneath the body, one directly above, and one on each side.

When placed upon the water at rest, the bait will float in the position shown in Fig. 1, but when drawn through the water by the line 5, the bait will sink more or less deeply below the surface, dependent upon the speed, and the varying pressure of water currents and eddies upon the cheeks 13 and along the reversely curved flutes 12 will cause the bait to progress through the water with a wavering, sinuous motion closely resembling the swimming of a minnow and leaving a wake similar to that of live bait.

The bait is a very efficient one by reason of its deceptiveness, and an inexpensive one on account of its simplicity of form, while the absence of moving parts lengthens the period of usefulness.

The only modification required to adapt the bait for use in different waters and for different kinds of fish, is a variation in the style of painting the body portion, the coloration of the bait forming no part of this invention but being left to the judgment of the maker and conditions of use.

What is claimed is:

1. An artificial bait comprising a conical flotative body having formed in its surface a plurality of longitudinal flutes with their axes extending in a general direction parallel to the axis of the body, said flutes symmetrically spaced about the body and extending from the medial portion to and merging into the front face of the body and adapted to cause the latter to move in a zig-zag course when drawn through the water, and hooks carried by the body.

2. An artificial bait comprising a conical flotative body having a tapered tail portion and a blunt rounded head portion, said body having formed in its front face a plurality of longitudinal flutes with their axes extending in a general direction parallel to the axis of the body and lying within planes including said body axis, said flutes symmetrically spaced about the body and extending from the medial portion to and merging into the front face of the head portion, the flutes gradually widening and deepening toward the head and spaced apart by fillets of a width diminishing toward the head end of the body, which is caused to move in a zig-zag course when drawn through the water, and hooks carried by the body.

3. An artificial bait comprising a conical flotative body having a tapering tail portion and a blunt rounded head portion, said body having formed in its surface a plurality of longitudinal flutes with their axes extending in a general direction parallel to the axis of the body and lying substantially within planes including said body axis, said flutes symmetrically spaced about the body and extending from the medial portion toward and merging into the front face of the head portion, the flutes gradually widening toward the head and also deepening toward the head to form in section a reverse curve, said flutes being spaced apart by fillets of a width diminishing toward the head and losing themselves in the merging walls of the flutes, which cause the body to move in a zig-zag course when drawn through the water, and hooks suspended beneath the body along the line of one of the fillets.

In testimony that I claim the foregoing as my own, I have hereto affixed my signature in the presence of two witnesses.

RICHARD T. WILSON.

Witnesses:
ABEN E. JOHNSON,
ANNA HETMANSPERGER.